United States Patent Office 3,476,717
Patented Nov. 4, 1969

3,476,717
PROCESS FOR THE PRODUCTION OF POLYMERS
Hanswilli von Brachel, Offenbach am Main, and Fritz Engelhardt, Frankfurt am Main-Fechenheim, Germany, assignors to Cassella Farbwerke Mainkur Aktiengesellschaft, Frankfurt am Main-Fechenheim, Germany, a corporation of Germany
No Drawing. Filed July 18, 1967, Ser. No. 654,077
Claims priority, application Germany, July 21, 1966
C 39,671
Int. Cl. C08f 1/62
U.S. Cl. 260—78.5     6 Claims

ABSTRACT OF THE DISCLOSURE

N-substituted carbamates of the formula

wherein R, R' and R" stand for alkyl, cycloalkyl, aryl, nitroaryl, haloaryl and aralkyl radicals and R" furthermore for hydrogen, are used as reducing component of a redox catalyst system in the polymerization of olefinically unsaturated monomers.

---

The present invention relates to an improvement in the polymerization of olefinically unsubstituted monomers in the presence of redox catalysts.

From German patent application No. 1,215,154, it is known that compounds containing the group

at least once in the molecule are effective polymerization inhibitors.

Surprisingly, we now have found that compounds of a similar structure having the general formula

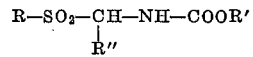

wherein R, R' and R" stand for alkyl, cycloalkyl, aryl, nitroaryl, haloaryl and aralkyl radicals and R" furthermore for hydrogen, may advantageously be used as reducing catalyst components in the redox polymerization of olefinically unsaturated monomers.

Accordingly, the subject of the present invention is a process for the manufacture of homo and copolymers from olefinically unsaturated monomers by means of a redox catalyst system, which comprises using as reducing components of such system compounds having the general formula

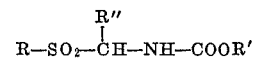

wherein R, R' and R" have the meaning as given above.

Suitable monomers under the present invention are, for instance, acrylic acid, methacrylic acid as well as its salts, esters and amides, methylol acrylamide or methylol methacrylamide and their reaction products together with amines and alcohols, vinyl pyrrolidinone, vinyl carbazole, vinyl-methyl ketone, acrylonitrile, vinylidene cyanide, esters of unsaturated alcohols, such as vinyl acetate, diallyl phthalate, styrene, α-methylstyrene, vinyl toluene, halogstyrenes, such as 2,5-dichloro styrene, allyl benzene and dienes, such as butadiene, isoprene and chloro butadiene.

Reducing polymerization initiators of the above-mentioned structural formula, which are utilizable according to the present invention are, for example: N-ethyl-sulfone-methyl methyl carbamate, N-cyclohexyl-sulfone-methyl methyl carbamate, N-p-tolyl-sulfone-methyl ethyl carbamate, N-p-tolyl-sulfone-methyl butyl carbamate, N-p-tolyl-sulfone-methyl benzyl carbamate, N-p-tolyl-sulfone-methyl phenyl carbamate, N-p-nitro-phenyl-sulfone-methyl methyl carbamate, N-p-chloro-phenyl-sulfone-methyl methyl carbamate, N-[phenyl-(p-tolyl-sulfonyl)-methyl]methyl carbamate, N-[phenyl-(p-tolyl-sulfonyl)-methyl]ethyl carbamate, N-[methyl-(p-tolyl-sulfonyl)-methyl]methyl carbamate, N-[p-nitro-phenyl-(p-tolyl-sulfonyl)-methyl]methyl carbamate, and N-[ethyl-(phenyl-sulfonyl)-methyl]methyl carbamate.

The preparation of such compounds, which does not fall under the present invention, may be carried out according to the methods described in Rec. 83, 733–36 (1964) and Rec. 84, 942 et seq. (1965). Accordingly, for instance the urethans are reacted in an aqueous solution with formaldehyde and the sodium salt of a sulfinic acid. When reacting urethans, which are not sufficiently soluble in water, it is most advantageous to use the aqueous mixtures of organic solvents, such as dioxane or tetrahydrofuran.

As oxidizing components of the catalyst system, as usual atmospheric oxygen and both organic and inorganic peroxide-compounds are used, such as benzoyl peroxide, tert-butyl hydroperoxide, di-tert-butyl hydroperoxide, lauroyl peroxide, cumene hydro-peroxide, acetyl peroxide, methyl-ethyl-ketone peroxide, hydrogen peroxide, potassium peroxy disulfate, and ammonium peroxy disulfate.

By adding chloride ions, higher molecular weights and better polymer yields are achieved.

Kinetic investigations of the polymerization have demonstrated that the concentration of radicals during the polymerization reaction diminishes more slowly by working according to the process under the present invention than by using redox initiators as are hitherto known. Thus, uniform polymers of high molecular weight are obtained when the conversion of monomers is more than 90 percent.

The process under the present invention may be used for preparing precipitation, emulsion, solution and substance polymers.

Particularly favorable results are compassed when the homo and copolymers of the acrylamide are prepared both in an aqueous solution and by precipitation polymerization from tertiary butanol. The homopolymers prepared in this manner distinguish themselves by an excellent water-solubility and high molecular weights.

The polymerization is carried out according to a method known per se under atmospheric pressure and at temperatures ranging from between 0 and 120° C., preferably, however, from between 20–70° C., whereby the preferred concentration of the reducing component of the system used under the present invention, having the general formula

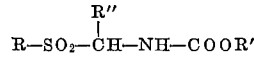

is between 0.02 and 0.5%, and the share of the oxidizing component ranges from between 0.25–2.0% roughly, related to the corresponding monomer or monomeric mixture.

The following examples are intended to illustrate the present invention. All temperatures are given in degrees centigrade.

EXAMPLE 1

With stirring in a nitrogen atmosphere, 0.71 g. dibutylamino hydrochloride are added to a solution of 71 g. acrylamide in 1300 cc. water. Then, at 40°, 35 cc. of a 2% solution of N-p-tolyl-sulfone-methyl methyl carbamate in dimethyl sulfoxide, and after 5 minutes 28 cc. of a 10% aqueous ammonium peroxy disulfate solution are added.

While this solution is being slowly stirred, the polymerization sets in after an induction period of 35 minutes, which causes the temperature to rise to 46° in the course of 2 hours and to drop again to 40° after another 3 hours. Thus, a high-viscous polymer solution being as clear as water, is formed having a K-value of 195 (determined in a 0.5% aqueous solution).

EXAMPLE 2

Analogously to the description given in Example 1, a mixture of 35 g. acrylamide and 65 g. hydroxy-ethyl methacrylate in 900 cc. water is polymerized at 50° by adding 0.5 g. N-p-tolyl-sulfone-methyl methyl carbamate in 5 cc. dimethyl sulfoxide, 10 cc. of 10% aqueous ammonium peroxy disulfate solution and 1.0 g. dibutyl-amino hydrochloride. The K-value of the copolymer thus obtained amounts to 112.

EXAMPLE 3

71 g. acrylamide and 9 g. diethylaminomethylene acrylamide are dissolved in 1300 cc. water and polymerized as described in Example 1. A high-viscous polymer solution being as clear as water is obtained. The polymer has a K-value of 187. The same result is compassed when N-p-nitrophenyl-sulfone-methyl methyl carbamate is used as a reducing catalyst component.

EXAMPLE 4

With stirring, 142 g. acrylamide are dissolved in a mixture consisting of 32 cc. water and 880 cc. tertiary butanol.

After the addition of 0.7 g. dibutyl-amino hydrochloride, the solution is heated to 50° in a nitrogen atmosphere. Then 10 cc. of a 1% solution of N-p-tolyl-sulfone-methyl methyl carbamate in dimethyl sulfoxide and 4 cc. of a 10% aqueous ammonium peroxy desulfate solution are added.

After an induction period of 20 minutes the polymer starts to precipitate while the temperature rises to 56° in the course of 1½ hours. After another 2 hours the polymerization is terminated. The polymer obtained in the form of a purely white paste is suction-filtered and vacuum-dried at 50°.

Yield: 140 g. (=89.5% of the theoretical). If N-p-chloro-phenyl-sulfone-methyl methyl carbamate is used, the induction period is shortened to 5 minutes.

The polyacrylamide thus prepared is easily soluble in water without leaving any residue. It has a K-value of 166 (measured in a 0.5% aqueous solution).

EXAMPLE 5

71 g. acrylamide and 50 g. maleic anhydride are dissolved in 400 cc. tertiary butanol. By admixing 1.0 g. dibutyl-amino hydrochloride, 70 cc. of a 1% solution of N-p-tolyl-sulfone-methyl benzyl carbamate in dimethyl sulfoxide and 14 cc. of a 20% aqueous ammonium peroxy disulfate solution, the polymerization is started at 60°. Working up is done as described in Example 4. 112 g. of a slightly yellow, hygroscopic powder are obtained yielding viscous solution in aqueous alkalies.

EXAMPLE 6

6.0 g. polyvinyl alcohol are dissolved in 153 cc. water, 0.8 g. sodium carbonate are added and the mixture is heated to 68°. After the admixture of 0.5 g. dibutyl-amino hydrochloride and 1.1 g. N-p-tolyl-sulfone-methyl methyl carbamate, 220 g. vinyl acetate and a 1% solution of ammonium peroxy disulfate in 42 cc. water are added dropwise within 3 hours, the temperature rising to 80°. This temperature is maintained until the exothermic reaction is terminated, then stirring is continued at 90° for 1 hour.

Thus, a purely white, creamy polymer dispersion having an excellent stability in storage is obtained. The precipitated polymer has a K-value of 85.

EXAMPLE 7

A solution of 71 g. acrylamide in 1300 cc. water is admixed, with stirring, in a nitrogen atmosphere, with 0.71 g. dibutyl-amino hydrochloride and then at 40° with 35 cc. of a 2% solution of N-(phenyl-p-tolyl-sulfonyl-methyl) methyl carbamate in dimethyl sulfoxide, and, after 5 minutes, with 25 cc. of a 10% aqueous ammonium peroxy disulfate solution.

While the solution is being slowly stirred, the polymerization sets in after an induction period of 25 minutes. After 5 hours' time, the polymerization is terminated. A high-viscous polymer solution being as clear as water is obtained. The polymer has a K-value of 117.5 (determined in a 0.5% aqueous solution).

EXAMPLE 8

Analogously to the description given in Example 7, a solution of 71 g. acrylamide in 1300 cc. water is polymerized at 60° by adding 20 cc. of a 2% solution of N-(methyl-p-tolyl-sulfonyl-methyl) methyl carbamate in dimethyl sulfoxide, 10 cc. of a 10% aqueous ammonium peroxy disulfate solution and 0.7 g. dibutyl-amino hydrochloride. The polymer thus obtained has a K-value of 85.9.

What is claimed is:

1. An improvement in the process for the production of homopolymers and copolymers from olefinically unsaturated monomers in the presence of a redox catalyst system, comprising the step of using as reducing component in the redox catalyst system an N-substituted carbamate of the formula

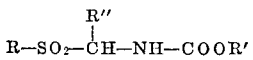

wherein R, R′, and R″ stand for alkyl, cyclohexyl, phenyl, nitrophenyl, halophenyl and benzyl radicals and R″ furthermore for hydrogen, and wherein the oxidizing component is a member selected from the group consisting of oxygen, organic peroxide compounds, and inorganic peroxide compounds.

2. The process of claim 1 wherein the monomer is acrylamide or a mixture of acrylamide and hydroxy-ethyl methacrylate and wherein the said reducing component is N-p-tolyl-sulfone-methyl methyl carbamate.

3. The process of claim 1 wherein the monomers are acrylamide and diethylaminomethylene acrylamide and wherein said reducing component is N-p-nitrophenyl-sulfone-methyl methyl carbamate.

4. The process of claim 1 wherein the monomer is acrylamide and the said reducing component is N-p-chloro-phenyl-sulfone-methyl methyl carbamate.

5. The process of claim 1 wherein the monomers are acrylamide and maleic anhydride and the said reducing component is N-p-tolyl-sulfone-methyl benzyl carbamate.

6. The process of claim 1 wherein the monomer is polyvinyl alcohol and wherein the said reducing component is N-p-tolyl-sulfone-methyl methyl carbamate.

References Cited

Recueil Destravaux Chimiques Des Pays-Bas T. 83; 733–36 (1964).

Recueil Destravaux Chimiques Des Pays-Bas T. 84; 942 et seq. (1965).

JOSEPH L. SCHOFER, Primary Examiner

JOHN KIGHT, Assistant Examiner

U.S. Cl. X.R.

252—436, 438; 260—80, 82.1, 85.7, 86.1, 87.5, 88.3, 89.7, 91.3, 91.5, 93.5, 94.6